UNITED STATES PATENT OFFICE.

DAVID M. KELSEY, OF SARATOGA SPRINGS, NEW YORK, ASSIGNOR TO THE ANTISEPTIC POWDER COMPANY, OF SAME PLACE.

DISINFECTANT.

SPECIFICATION forming part of Letters Patent No. 659,621, dated October 9, 1900.

Application filed February 9, 1900. Serial No. 4,663. (No specimens.)

*To all whom it may concern:*

Be it known that I, DAVID M. KELSEY, a citizen of the United States, and a resident of Saratoga Springs, county of Saratoga, and State of New York, have invented a certain new and useful Composition of Matter to be Used as a Deodorizer and Disinfectant, of which the following is a specification.

My invention relates to a composition of matter to be applied to the floors of stables, ferry-boats, bridges, street hack-stands, or wherever animal excrements are deposited; and its object is to thoroughly and effectively deodorize and disinfect such places. The odor arising from this composition when it is exposed upon the floor has a tendency to kill lice, flies, mosquitos, and all vermin that infest the atmosphere, and at the same time is not injurious to flesh, wool, hair, feathers, &c.

My composition consists of the following ingredients, combined in the proportions stated and which are given in weight: hydrated calcium sulfate, seventeen parts; charcoal, two parts; dried peat, one part; sulfur, sublimed, three-tenths part; ferric oxid, one-tenth part, and crude phenic acid, thirty per cent., one twenty-fifth part. The first five ingredients are prepared by reducing to a fine powder. The acid and sulfur are then united, this compound being then dried by the introduction of sufficient calcium sulfate for this purpose. The carbon is next introduced, followed by the remaining ingredients, the whole being reduced to a homogeneous mass, in which condition the compound presents the appearance of a drab or gray flour, slightly tinged with brown, of soft but gritty feeling, and with a slight odor of the acid remaining.

The hydrated calcium sulfate above mentioned is made up of the following constituents in the proportions given: lime, 32.56 per cent.; sulfuric acid, 46.51 per cent., and water, 20.93 per cent.

The proportions as herein stated may be varied slightly, according to the analysis of the raw materials, as from time to time determined.

What I claim, and desire to secure by Letters Patent, is—

The above-described composition of matter consisting of hydrated calcium sulfate, charcoal, dried peat, sulfur, ferric oxid, and crude phenic acid, in the proportions specified, substantially as described and for the purpose specified.

In testimony that I claim the foregoing as my invention I have signed my name, in presence of two witnesses, this 3d day of February, 1900.

DAVID M. KELSEY.

Witnesses:
O. V. HOWLAND,
A. V. ISBELL.